United States Patent Office 3,708,547
Patented Jan. 2, 1973

3,708,547
SYNTHESIS OF [10]-ANNULENES
Peter H. Nelson and Karl G. Untch, Los Altos, Calif.,
 assignors to Syntex Corporation, Panama, Panama
No Drawing. Filed Sept. 2, 1969, Ser. No. 854,741
Int. Cl. C07c 17/32, 23/18
U.S. Cl. 260—648 R                12 Claims

ABSTRACT OF THE DISCLOSURE

New process for preparing [10]-annulene compounds which are useful as estrogenic, anti-inflammatory, and anti-fertility agents. The process utilizes the steps of adding a methano, dichloromethano, or difluoromethano group across the C-9,10 double bond of a 1,4,5,8-tetrahydronaphthalene to the corresponding 9,10-bridged-1,4-5,8,9,10 - hexahydronaphthalene and treating the latter with a benzoquinone to the corresponding 1,6 - bridged-[10]-annulene product. The preparations of 1,6-methano-[10]-annulene, 1,6-dichloromethano-[10]-annulene, and 1,6-difluoromethane-[10]-annulene are illustrated as representative of the process.

---

The present invention relates to a new process in organic chemistry. More particularly, the present invention is directed to a new process useful for the preparation of useful 1,6-bridged-[10]-annulenes of the following skeletal Formula A:

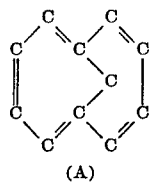

(A)

Processes for preparing 1,6-methano-[10]-annulene and other related compounds have been described by Vogel et al., in Angew. Chem. 76, 145, (1964, Angew. Chem. Internat. Edit. 3, 228 (1964, and Angew. Chem. Internat. Edit. 7, 288 (1968).

The present invention is directed to a new process useful for the preparation of 1,6-bridge-[10]-annulenes. By employing, for the sake of convenience and simplicity, partial structural formulas, the methods by which these compounds can be prepared in accordance herewith can be depicted by the following equation:

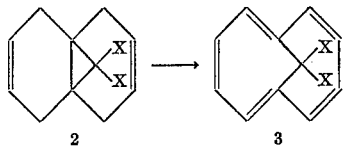

wherein each X is hydrogen, chloro, or fluoro.

With reference to the above equation, the process of the present invention in a first, principal aspect resides in a process comprising the step of treating a 9,10-bridged-1,4,5,8,9,10-hexahydronaphthalene (2) with a benzoquinone to yield the corresponding 1,6-bridge-[10]-annulene (3).

In accordance herewith, a starting compound containing the skeleton formula outlined by Formula 2 is reacted together with a benzoquinone. This reaction is conveniently performed in the presence of inert, liquid organic reaction medium. Suitable media include the normally employed organic solvents such as tetrahydrofuran, dioxane, dimethylformamide, n-hexane, toluene, benzene, mesitylene, diethyl ether, the mono- or di-lower alkyl ethers of diethylene glycol or triethylene glycol, for example, diglyme and triglyme, and the like. This reaction is further conducted at temperatures ranging from about 0° C. up to the boiling point of the reaction mixture and under reflux for a period of time sufficient to complete the reaction ranging from about a few minutes to about forty-eight hours.

The reaction is optionally performed in the presence of an anhydrous acid such as p-toluene sulfonic acid, hydrochloric, perchloric and sulphuric. However, while the addition of these acids may under the most favorable circumstances be preferred, their presence is not an absolute necessity for the practice of the present invention.

Suitable benzoquinones for this reaction include the ortho- and parabenzoquinones which can be unsubstituted or substituted with one or more groups, notably acyl and halogen, including, in the latter category, bromo, chloro and fluoro. Typical benzoquinones include 1,2-benzoquinone, 1,4 - benzoquinone, 2,3 - dichloro-5,6-dicyano-1,4-benzoquinone, tetrachloro-1,2-benzoquinone, 2,3-difluoro-1,4 - benzoquinone, 2,3-dibenzoyl-1,4-benzoquinone, 2,3-dicyano-1,4-benzoquinone, tetrachloro-1,4-benzoquinone, 2,3 - difluoro - 1,2-benzoquinone, 2,3-dicyano-1,2-benzoquinone, and the like. Preferred is 2,3-dichloro-5,6-dicyano-1,4-benzoquinone (DDQ).

In carrying out this reaction, the starting compound (2) and the benzoquinone are mixed and maintained together in any convenient order or fashion. The reaction mixture is then maintained within the given temperature range for a period of time sufficient to complete the reaction. Upon the completion of the reaction, the reaction mixture is processed by conventional procedures such as dilution, chromatography, decantation, filtration, distillation, evaporation, extraction, and so forth to recover and isolate the desired product.

The given reaction consumes the respective reactants in the ratio of one mole of the starting compound (Formula 2) per two moles of the benzoquinone reactant.

Thus, while the use of chemical equivalent amounts of the reactants is preferred, it is not an absolute necessity; some of the desired product being prepared when employing any proportions thereof. In the usual practice, amounts of the benzoquinone are employed which range from about two moles to about 50 moles, preferably from about two to about five moles, per mole of starting compound.

In those instances wherein each X in the starting material is chloro, the 1,6-dichloromethano-2,5-dihydro-[10]-annulene intermediate compound is prepared. This is readily converted to the 1,6 - dichloromethano-[10]-annulene product by first converting it to the corresponding 3,4-dibromo compound followed by the dehydrobromination thereof.

In those instances in which each X in the starting material (2) is fluoro, the employment of about one mole of the benzoquinone results predominantly in the preparation of 1,6-difluoromethano-2,5-dihydro-[10]-annulene. When emp'oying amounts of benzoquinone in excess of about two moles of the benzoquinone per mole of starting material (2), the 1,6 - difluoromethano - [10] - annulene product is prepared. The 1,6-difluoromethano-2,5-dihydro-[10]-annulene intermediate compound can be readily converted to the 1,6-difluoromethano-[10]-annulene product through the 3,4-dibromo compound, as described above for the dichloromethano compound.

The process of the present invention, in a second aspect, resides in a two step process for the preparation of 1,6- bridged-[10]-annulenes, as depicted below by the equation of partial formulas:

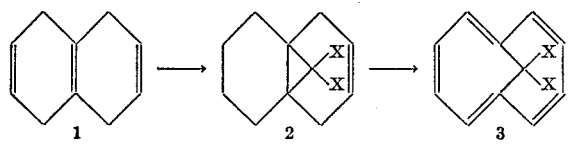

This process comprises the steps of adding the group $$>CX_2$$

wherein each X is hydrogen, chloro, or fluoro, across the C-9,10 double bond of a 1,4,5,8-tetrahydronaphthalene (1) to yield the corresponding 9,10-bridged-1,4,5,8,9,10-hexahydronaphthalene (2) and treating the resultant 9,10-birdged-1,4,5,8,9,10-hexahydronaphthalene (2) with a benzoquinone to yield the corresponding 1,6-bridged-[10]-annulene (3).

In the foregoing process, the second (2→3) step furnishes the 1,6-bridged-[10]-annulene products which are useful as hereinafter set forth. Thus, the usefulness of the first step resides in the preparation of the 9,10-bridged-1,4,5,8,9,10-hexahydronaphthalenes which are useful as intermediates for the preparation of the 1,6-bridged-[10]-annulene products hereof.

In accordance with the embodiments of this process of the present invention, the first step involves the addition of a $>CX_2$ group across the C-9,10 double bond of a 1,4,5,8-tetrahydronaphthalene compound (1). The $>CX_2$ group is generally generated in situ and in the presence of inert, liquid organic reaction medium. Suitable media include those defined above for the benzoquinone reagent as well as the chlorinated hydrocarbon solvents such as methylene chloride, chloroform, and carbon tetrachloride.

The halocarbene reactant is generated from a haloform and alkali metal tertiary alkoxide, or from an alkali or alkaline earth metal salt of a trihaloacetic acid, such as sodium trichloroacetate, or from a phenyltrihalomethyl mercury such as phenyltrifluoromethyl mercury and phenyltrichloromethyl mercury.

The halocarbene reactant is prepared by reacting together a haloform, wherein the halo is defined above, with an alkali tertiary alkoxide. In one procedure, the reaction mixture containing haloform and alkali metal tertiary alkoxide is heated to the boiling point and maintained under reflux for a period of time sufficient to produce the halocarbene reactant ranging from about 30 minutes to about 5 hours. Suitable haloforms employed in the above process include chloroform, bromodichloromethane, and chlorodifluoromethane. Representative alkali metal tertiary alkoxides employed in the above process include potassium t-butoxide and sodium t-amylate.

The reaction can also be performed by reacting together the starting compound and a phenyltrihalomethyl mercury such as phenyltrifluoromethyl mercury and phenyltrichloromethyl mercury. This reaction is conveniently conducted in liquid organic reaction medium, such as those listed above, and at temperatures of from about 25° C. to the boiling point of the reaction mixture.

In another procedure, the starting compound is reacted with an alkali or alkaline earth metal salt of the trihaloacetic acid in an organic solvent, preferably diglyme or triglyme, and at a temperature above the decomposition temperature of the salt. In this regard, the details of U.S. 3,338,928 are hereby incorporated by reference.

In those instances in which each X is hydrogen, the methylene group is generated from zinc:copper couple, methylene iodide reagent. The zinc: copper couple, methylene iodide reagent is prepared from zinc dust, a copper salt such as cuprous chloride and methylene iodide. Typically, the reagent is prepared by contacting together a mixture of the copper salt, zinc dust, and an organic solvent, such as diethyl ether, and methylene iodide, conveniently at the reflux temperature of the mixture. See U.S. Pat. 3,408,372, which is hereby incorporated by reference.

In the practice of the method of this step (Formula 1→Formula 2), the product of the reaction is isolated and recovered via the usual techniques as described above. The reaction step (Formula 2→Formula 3) is performed as described above.

The foregoing reaction sequences have been depicted utilizing partial formulas. This was done for the sake of simplicity and convenience to clearly depict the manner in which the novel, general process of the present invention is performed, regardless of the molecular substitution which may be present.

In the preferred embodiments, the process of the present invention is useful for the preparation of compounds of the following formulas:

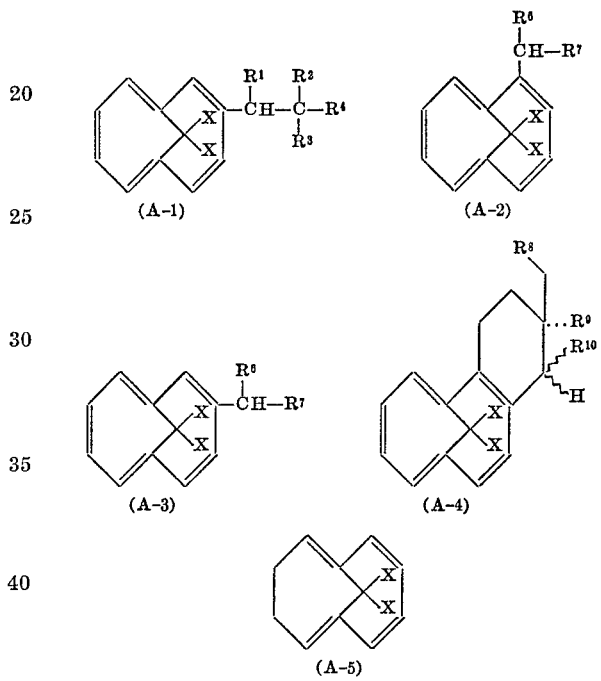

wherein, in each applicable formula, each X is hydrogen, chloro, or fluoro;

each of $R^1$, $R^2$, and $R^3$ is alkyl of one to three carbon atoms;

$R^4$ is formyl, hydroxymethyl and the conventional hydrolyzable esters and ethers thereof, carboxy and the alkali metal salts thereof, carbalkyloxy, carbonyl chloride, carbonyl fluoride, carbamoyl, or carbonylhydroxyamino;

$R^6$ is hydrogen or alkyl of one to three carbon atoms;

$R^7$ is $R^4$ exclusive of carbonyl chloride and carbonyl fluoride;

$R^8$ is hydrogen or methyl;

$R^9$ is $R^4$ exclusive of carbonyl chloride, carbonyl fluoride, carbamoyl, and carbonylhydroxyamino; and $R^{10}$ is methyl or ethyl.

The compounds represented by Formula A–2 can be prepared from the compounds represented by Formula A–5. Thus, the 1,6-bridged-[10]-annulene products can be acetylated at the C-2 position and the resultant derivative converted to the C-2 carboxylic acid. This compound is then converted to its acid chloride which is treated with diazomethane to afford the corresponding diazoketone. This can be thence converted to the C-2 carboxymethyl (acetic acid) compound corresponding to the compound of Formula A-2 wherein $R^6$ is hydrogen and $R^7$ is carboxy. Alternatively, the annulene products of Formula A–5 can be acetylated with acetyl chloride in methylene chloride in the presence of about three molar equivalents of stannic chloride. The resulting derivative is heated with morpholine in the presence of sulfur at about 150° C., and the resulting product is heated with concentrated hydrochloric acid to yield the corresponding annulene acetic acid.

The compounds represented by Formula A–1 are estrogenic agents useful, for example, in veterinary medicine for the treatment of underdeveloped females, for caponization of poultry, for the fattening of cattle, and in the control and regulation of fertility. The compounds represented by Formulas A–2 and A–3 are anti-inflammatory, analgesic and anti-pyretic agents useful, for example, for the treatment of inflammatory conditions and associative pain therewith, for example, of the skin, bones, and muscle. The compounds represented by Formula A–4 are estrogenic and anti-fertility agents useful, for example, in the treatment of estrogen deficiencies, and in the control and regulation of fertility. These compounds can be used in accordance with their activity in the same way in which known compounds having similar activity are used. For example, the compounds of Formulas A–1 and A–4 can be used in the same manner as mestranol and the like, and the compounds represented by Formulas A–2 and A–3 can be used in the same manner as phenylbutazone. Generally speaking, the compounds are formulated in accordance with the usual and known skills in the art in which the compound is to be employed and at dosage levels appropriate for the condition being treated and its degree or severity.

In the use of the estrogenic and anti-fertility compounds for fertility control in rodents, edible carriers can be used in the formulation of the compounds into baits. These edible carriers include liquids, solids, and mixtures thereof which are commonly employed in this art including water, milk, molasses, corn oil, peanut oil, sugar, peanut butter, chicken mash, dairy mixes, corn, oats, wheat, bran, meat, fish, lard, hay, cheese, salt, and the like. Also, these baits can include conventional pest attractants or other additives normally employed in baits of this type.

Carriers useful for incorporation with the compounds of Formulas A–2 and A–3 to prepare formulations include dextrose, starch, cellulose, and the like. In addition other biologically active compounds can be admixed with the formulations which can take the form of pills, syrups, creams, emollients, tablets, capsules, aerosols, and the like.

The starting compounds represented by partial Formula 1, with reference to the products represented by the Formulas A–1, A–2, A–3, A–4 and A–5 are known or can be prepared by reacting a substituted or unsubstituted naphthalene compound together with an alkali metal and an alcohol in a solvent such as a lower alkyl amine or diamine such as methylamine, diethylamine, and the like or in liquid ammonia. Suitable and preferred alkali metals are sodium, potassium, and lithium. This reaction is conveniently conducted in the presence of a monohydric lower alkanol of from 1 to 6 carbon atoms such as methanol, ethanol, n-propanol, isopropanol, n-butanol, isobutanol, sec-butanol, t-butanol, n-amyl alcohol, and the like, either alone or in admixture with other organic liquid reaction media, such as dioxane, tetrahydrofuran, diethyl ether, glyme, dimethylsulfoxide, n-hexane, and the like. The reaction is further conducted at temperatures ranging from about −80° C. to 100° C. and for a period of time sufficient to produce product, ranging from about five minutes to about two weeks.

In certain instances, the various substituents present on the product can be introduced at a time subsequent to or they can be protected during the principal processes of the present invention. This is preferred in order to avoid chemical interference or competition of certain groups and is done in accordance with the ordinary level of skill in the art. Thus, the present invention is preferably practiced utilizing starting compounds bearing the substituents represented by groups $R^1$, $R^2$, $R^3$, $R^6$, $R^8$, and $R^{10}$ in the above depicted formulas. The substituents represented by $R^4$, $R^7$, and $R^9$ are preferably introduced after the principal reactions although the process hereof can be conducted, with certain qualifications which are within the skills of the art, upon the starting compounds as above depicted and defined.

In the preferred embodiments, the carboxylic esters and salts and the carbonyl chloride and carbonyl fluoride groups are derived from the carboxylic acid subsequent to the principal reactions hereof. Similarly, the carbonylhydroxyamino group is formed from the esters subsequent to the principal process. All of these latter conversions are known per se.

Thus, the process of the present invention is practiced by performing the principal steps followed by the additional steps, in optional order and to the extent required and desired, of:

(1) oxidizing any hydroxymethyl to the corresponding alkehyde, (2) esterifying any hydroxyl group, (3) etherifying any hydroxyl group, (4) cleaving any ester or ether group to the corresponding hydroxyl, (5) esterifying any carboxylic acid, (6) reducing any ester to the corresponding alcohol, (7) converting any carboxylic acid to the corresponding acid metal salt, (8) converting any carboxylic acid to the corresponding acid chloride, (9) converting any carboxylic acid to the corresponding acid fluoride, and

(10) converting any carboxylic acid or ester to the corresponding amide.

In the present specification and claims, the term "lower alkyl," unless otherwise qualified, denotes a straight or branch chain aliphatic hydrocarbon group containing from one to six carbon atoms, inclusive, such as methyl, ethyl, n-propyl, isopropyl, n-butyl, isobutyl, t-butyl, n-pentyl, amyl, and n-hexyl. The term "lower alkoxy" refers to a —OAlk group wherein Alk is a lower alkyl as defined above. The term "lower carboxylic acyloxy" denotes a carboxylic acyloxy group containing up to about eight carbon atoms of a straight, branched or cyclic chain structure. Typical lower carboxylic acyloxy groups are acetate, trifluoroacetate, p-methoxybenzoate, trimethylacetate, butyrate, and the like. The expression "conventional hydrolyzable esters and ethers," as used herein, refers to those physiologically acceptable hydrolyzable ester groups and labile ether groups conventionally employed in the pharmaceutical art such as acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo[2.2.2]octane-1-carboxylate, adamantoate, dihydrogen phosphate, dibenzyl phosphate, sodium ethyl phosphate, sodium sulfate, sulfate, tetrahydropyran-2-yl ether, tetrahydrofuran-2-yl ether, 4-methoxytetrahydropyran-4-yl ether, cyclopentyl ether, and the like. The expression "formyl" denotes the —CHO group, the expression "carbamoyl" denotes the $CONH_2$ group, and the term "carbonylhydroxyamino" denotes the CONHOH group.

In the present specification and claims, the term "bridged," with respect to the C-1,6 carbon atoms in the [10]-annulene products hereof, or C-9,10 carbon atoms in the carbon atoms in the compounds useful for preparing these products, refers to a methano or dihalomethano group, that is, a group represented by the formula

each X being hydrogen, chloro or fluoro.

The following preparations and examples serve to further typify the manner by which the present invention can be practiced and represent, in one aspect, the best mode for carrying out the invention. As such, however, they

PREPARATION 1

A mixture of 10 grams of naphthalene and three ml. of t-butanol is dispersed in a mixture of 100 ml. of ammonia and 50 ml. of tetrahydrofuran at −30° C., with stirring. Lithium wire (1500 mg.) is then added to the resultant solution in a portion-wise fashion at reflux temperature with stirring. The resultant mixture is allowed to stand for a short period and the ammonia is then allowed to evaporate. After the evaporation, 100 ml. of water and 100 ml. of diethylether are added to the resultant mixture. The ether layer is separated and washed with water, dried, and evaporated to obtain a residue which is recrystallized from methanol to obtain the 1,4,5,8-tetrahydronaphthalene product.

PREPARATION 2

Liquid ammonia which has been dried over sodium metal and distilled (600 ml.), 300 ml. of dry tetrahydrofuran, and 150 ml. of dry methanol are mixed together with stirring. After the mixing period, 10 grams of 2-(naphth-2′-yl)-propionic acid are added to the mixture while continuing stirring. To the resultant mixture are added 5 grams of lithium wire in 0.5 gram portions over a period of two hours while maintaining the reaction mixture at reflux temperature. After the end of the reaction period, the ammonia is allowed to evaporate and water (100 ml.) and then 10% hydrochloric acid (200 ml.) are added. The reaction mixture is then extracted with ethyl acetate and the extracts dried over sodium sulfate and evaporated. The residue after evaporation is recrystallized from methanol to provide 2-(1′,4′,5′,8′-tetrahydronaphth-2′-yl)-propionic acid.

PREPARATION 3

A mixture of 5 g. of triphenylphosphine, 1.5 molar equivalents of methoxymethyl chloride and 200 ml. of ether is refluxed for about two hours. The reaction mixture is cooled and precipitated methoxymethyltriphenylphosphonium chloride collected by filtration.

Two grams of methoxymethyltriphenylphosphonium chloride is stirred in 10 ml. ether under nitrogen and a solution of 1.1 molar equivalents of phenyl lithium is added at about 0° C. One molar equivalent of 2-acetyl-naphthalene in benzene is added quickly while maintaining the temperature at about 0° C. The reaction mixture is allowed to come to room temperature and methanol is added until a substantially clear solution is obtained. The solution is then washed with water, dried over magnesium sulfate and evaporated to dryness. The residue is dissolved in hot ethyl acetate, an equal volume of hot hexane added, cooled, filtered to remove triphenylphosphine oxide, and the filtrate evaporated. This residue is dissolved in hot ethyl acetate, an equal volume of hot hexane added, cooled, filtered, and the filtrate evaporated to yield 2-[2′(1′-methoxypropenyl)]-naphthalene.

Three grams of 2-[2′-(1′-methoxypropenyl)]-naphthalene is dissolved in 60 ml. of dioxane and 20 ml. of water containing 0.5 ml. of concentrated sulfuric acid. The solution is refluxed under nitrogen for three hours, cooled, poured into 100 ml. of water and extracted with ether. The ether extract is washed with dilute aqueous sodium bicarbonate, dried over magnesium sulfate and evaporated to yield 2-(naphth-2′-yl)-propanol which is recrystallized from ethyl acetate:hexane.

To a stirred solution of 1 g. of 2-(naphth-2′-yl)-propanal in 25 ml. tetrahydrofuran is added 1 gm. of sodium borohydride. The solution is stirred for 1 hour at room temperature and then 10 ml. 10% hydrochloric acid is added. The solution is poured into water and extracted with ether. The extract is washed with water, dried and evaporated to yield 2-(naphth-2′-yl)-propanol which is recrystallized from hexane.

2-(2′-naphthyl)-propanol (1 gram) is reacted with 1 gram of sodium metal and ammonia in the presence of methanol as set forth in Preparation 2 to obtain 2-(1′,4′,5′,8′-tetrahydronaphth-2′-yl)-propanol.

In accordance with the foregoing methods, the following starting compounds for the process of the present invention are prepared.

2-(1′,4′,5′,8′-tetrahydronaphth-2′-yl)-propanol-1-methylether,
2,2,3-trimethyl-3-(1′,4′,5′,8′-tetrahydronaphth-2′-yl)-propionic acid,
2,2-dimethyl-3-(1′,4′,5′,8′-tetrahydronaphth-2′-yl)-pentanoic acid ethyl ether,
2,2-dimethyl-3-(1′,4′,5′,8′-tetrahydronaphth-2′-yl)-pentanoic acid amide,
1-ethoxymethyl-1,4,5,8-tetrahydronaphthalene,
2-carboxymethyl-1,4,5,8-tetrahydronaphthalene,
2-carboxyethyl-1,4,5,8-tetrahydronaphthalene,
1-hydroxy-ethyl-1,4,5,8-tetrahydronaphthalene,
1-ethyl-2α-hydroxymethyl-2β-methyl-1,2,3,4,4a,5,8,9-octahydrophananthrene,
1-methyl-2α-carboxy-2β-ethyl-1,2,3,4,4a,5,8,9-octahydrophananthrene and,
1-methyl-2α-carboxy-2β-ethyl-1,2,3,4,4a,5,8,9-octahydrophananthrene.

EXAMPLE 1

Zinc dust (2.65 grams) and 0.75 gram of cuprous chloride are dispersed in 12.5 ml. of diethyl ether and the resultant solution is heated to the boiling point and maintained under reflux conditions and a nitrogen atmosphere for 30 minutes. After this period, the mixture is cooled to 0° C. and 1.5 ml. (5 grams) of methylene iodide are added thereto. Following the addition, the mixture is cautiously warmed to the boiling point and maintained under reflux conditions for 30 minutes. After this period, 1 gram of 1,4,5,8-tetrahydronaphthalene dispersed in 2 ml. of diethylether is added to the mixture which is cooled in ice water. The resultant mixture is maintained at 0° C. for 135 minutes after which time it is warmed to room temperature and maintained thereat for one hour and then warmed to reflux temperature. After refluxing for 90 minutes, the reaction mixture is cooled. A saturated aqueous ammonium chloride solution (5 ml.) is then added. The ether solution is washed with saturated aqueous sodium sulfite, and with water. The ether solution is then dried and evaporated. The crude product is chromatographed on 10 gm. silica gel eluting with hexane to provide the 9,10-methano-1,4,5,8,9,10-hexahydronaphthalene product.

EXAMPLE 2

9,10-methano-1,4,5,8,9,10-hexahydronaphthalene (220 mg.) is dispersed in 6 ml. of dioxane at room temperature with stirring. To the resultant mixture is added 1 gram of 2,3-dichloro-5,6-dicyano-1,4-benzoquinone with stirring while cooling the reaction mixture to 25° C. The resulting mixture is heated to the boiling point and maintained under reflux conditions for four hours. After this time, the solution is cooled and poured into pentane. The resultant mixture is filtered and the filtrate is washed twice with water, dried over magnesium sulfate, filtered through 1 gm. silica gel, and evaporated to provide the 1,6-methano-[10]-annulene product.

EXAMPLE 3

Three grams of zinc dust and one gram of cuprous chloride are stirred vigorously together in 25 ml. of diethyl ether. The resultant mixture is placed under a nitrogen atmosphere and refluxed while stirring vigorously for 30 minutes. The mixture is then cooled to 0° C. and 5 ml. of methylene iodide are added thereto. The resultant mixture is warmed to the boiling point and refluxed for thirty minutes. After this period, one gram of 2-(1′,4′,5′,8′-tetrahydronaphth-2′-yl)-propionic acid dispersed in 5 milliliters of dioxane is added to the mixture while cooling in ice water. After maintaining the resultant mixture at 0° C. for three hours, the solution is warmed to room temperature for one hour and then refluxed for two hours. The resultant mixture is then chromatographed on 50 gms. silica gel eluting with ether hexane (1:1) to provide the 2-(9',10' - methano - 1',4',5',8',9',10'-hexahydronaphth-2'-yl)-propionic acid product.

EXAMPLE 4

2-(9',10' - methano - 1',4',5',8',9',10'-hexayhdronaphth-2'-yl)-propionic acid (250 milligrams) is dispersed in 10 milliliters of glyme at room temperature with stirring. The resultant solution is cooled to about 0° C. To the cooled solution is added one gram of 1,4-benzoquinone with stirring. The reaction mixture is then heated to the boiling point and maintained under reflux conditions for six hours. The reaction mixture is then poured into etherhexane and the resultant mixture filtered and the filtrate washed with water. The filtrate is dried over magnesium sulfate and evaporated to provide the 2-(1',6'-methano-3'-[10]-annulene)-propionic acid product.

EXAMPLE 5

Part A 2-methyl-3-(1',4',5',8'-tetrahydronaphth - 2' - yl)-pentanoic acid methyl ester (40 grams) and 42.5 grams of potassium t-butoxide are dissolved in 2 liters of ether at −55° C. with stirring. To the resultant solution are added 36 grams of chloroform in 200 ml. of ether. The resultant reaction mixture is allowed to attain room temperature and then filtered and evaporated. The residue is recrystallized from ether:hexane to provide the 2-methyl-3-(9',10' - dichloromethano - 1',4',5',8',9',10' - hexahydronaphth-2'-yl)-pentanoic acid methyl ester product.

In a similar manner, 9,10-dichloromethano-1,4,5,8,9,10-hexahydronaphthalene is prepared from 1,4,5,8-tetrahydronaphthalene.

Part B

To a stirred and refluxing solution of 1 g. of 2-methyl-3-(1',4',5',8'-tetrahydronaphth-2'-yl)-pentanoic acid methyl ester in 10 ml. of dimethyl triethylene glycol ether is added in a dropwise fashion and under nitrogen, 10 ml. of a 50% w./v. solution of sodium trichloracetate. The solution is cooled and filtered and the filtrate is evaporated to dryness under reduced pressure. The residue thus obtained is chromatographed on alumina, eluting with hexane-methylene chloride, to yield the 2-methyl-3-(9',10'-dichloromethano - 1',4',5',8',9',10' - hexahydronaphth-2'-yl)-pentanoic acid methyl ester product.

In a similar manner, 9,10-dichloromethano-1,4,5,8,9,10-hexahydronaphthalene is prepared.

PART C

One gram of 2-methyl-3-(1',4',5',8'-tetrahydronaphth-2'-yl)pentanoic acid methyl ester and 2.7 grams of phenyltrichloromethyl mercury are dissolved in 50 ml. of dry benzene and the resulting mixture is refluxed for three hours under an atmosphere of nitogen. There is then added one additional gram of the mercury reagent and refluxing is continued for an additional five hours after this period. After the five hour reflux period, 1.7 additional grams of mercury reagent are added and the resultant mixture is the filtered and the filtrate is evaporated to dryness providing an oil which is chromatographed on silica gel. The fractions are eluted with hexane:ethyl acetate to provide the 2-methyl-3-(9',10'-dichoromethano-1',4',5',8',9',10'-hexahydronaphth-2'-yl)-pentanoic acid methyl ester product.

In a similar manner, 9,10-dichloromethano-1,4,5,8,9,10-hexahydronaphthalene is prepared.

EXAMPLE 6

2 - methyl-3-(9',10'-dichloromethano-1',4',5',8',9',10'-hexahydronaph-2'-yl)-pentanoic acid methyl ester (1 gram) is dispersed in 50 ml. of dioxane at room temperature. To the resultant mixture are added 5 grams of 2,3-dichloro-5,6-dicyano-1,4-benzoquinone at room temperature with stirring. The reaction mixture is then heated to the boiling point and maintained under reflux conditions for six hours. The reaction mixture is then chromatographed on 25 gm. silica gel eluting ether-hexane to provide the 2-methyl-3-(1',6'-dichloromethano-2',5'-dihydro-[10]-annulene)-pentanoic acid.

In a similar manner, 1,6-dichloromethano-2,5-dihydro-[10]-annulene is prepared from 9,10-dichloromethano-4,5,8,9,10-hexahydronaphthalene.

EXAMPLE 7

3 - (2-methyl-1',6'-dichloromethano-2',5'-dihydro-[10]-annulene)-pentanoic acid (67 mg.) is dispersed in 15 ml. of methylene chloride at room temperature. The resultant solution is is cooled to −80° C. and, when arriving at this temeprature, 1 molar equivalent of bromine dispersed in 1.8 ml. of methylene chloride is slowly added thereto. After ten minutes, the solution is evaporated and the residue recrystallized from ether methanol (1:1) to provide the 2 - methyl - 3 - (1',6'-dichloromethano-3',4'-dibromo-[10]-annulene)-pentanoic acid, which is dispersed in 6 ml. of dimethylformamide at room temperature with stirring. To the resultant solution is added 0.2 ml. of diazabicyclononene. After allowing this reaction mixture to stand for three days at room temperature, the solution is poured into water and extracted with ether. The ether extracts are isolated and washed with dilute hydrochloric acid and three times with water, and the washed material dried over magnesium sulfate and evaporated to provide the 2-methyl - (1',6' - dichloromethano-[10]-annulene)-pentanoic acid product.

In a similar manner, 1,6-dichloromethano-[10]-annulene is prepared from 1,6-dichloromethano-2,5-dihydro-[10]-annulene.

EXAMPLE 8

1α - ethyl-2α-carbomethoxy-2β-methyl-1,2,3,4,4a,5,8,9-octahydrophenanthrene (4 grams) and 2.5 grams of potassium t-butoxide are dispersed in 200 mls. of diethylether at −55° C. Five grams of chlorodifluoromethane in 50 ml. of ether are then added and the mixture is allowed to warm to room temperature. The solution is then filtered and evaporated and the residue recrystallized from ethyl acetate at −20° C. to provide the 1α-ethyl-2-carbomethoxy - 2β-methyl-4b,8a-difluoromethano-1,2,3,4,4a,4b,5,8,8a,9-decahydrophenanthrene product.

In like manner, 9,10-difluoromethano-1,4,5,8,9,10-hexahydronaphthalene is prepared from 1,4,5,8-tetrahydronaphthalene.

The procedures of Parts B and C of Example 5 are repeated using the starting material of the first paragraph of this example and sodium chorodifluoroacetate and phenyltrifluoromethyl mercury, respectively, to provide the 1α-ethyl-2α-carbomethoxy-2β-methyl-4b,8a-difluoromethano - 1,2,3,4,4a,4b,5,8,8a,9-decahydrophenanthrene product in each instance.

In like manner, 9,10 - difluoromethano - 1,4,5,8,9,10-hexahydronaphthalene is prepared.

EXAMPLE 9

1α - ethyl-2α-carbomethoxy-2β-methyl-4b,8a-difluoromethano-1,2,3,4,4a,4b,5,8,8a,9-decahydrophenanthrene (1 g.) is added to 10 ml. of dioxane at room temperature with stirring. The resultant mixture is maintained at 25° C. and one chemical equivalent of tetrachloro-1,4-benzoquinone is added thereto with stirring. The temperature of the reaction mixture is then raised to the boiling point and and maintained under reflux for six hours after which time it is poured into n-hexane. The resultant mixture is washed with water and filtered. The filtrate is washed with water, dried and evaporated to provide the 1α-ethyl-2α-carbomethoxy - 2β-methyl-4b,8a-difluoromethano-1,2,3,4,4a,4b, 8a-octahydrophenanthrene product.

In like manner, 2,5-dihydro-1,6-difluoromethano-[10]-annulene is prepared.

EXAMPLE 10

The product prepared as described in Example 9 is treated with bromine and the resultant compound dehydrobrominated as set forth in Example 7 above to prepare the 1α-ethyl-2α-carboxy-2β-methyl-4b,8a-seco-4b,8a-difluoromethane-1,2,3,4-tetrahydrophenanthrene product.

In like manner, 1,6-difluoromethano-[10]-annulene is prepared.

EXAMPLE 11

The procedure of Example 9 is repeated using about two chemical equivalents of tetrachloro-1,4-benzoquinone to provide the 1α-ethyl-2α-carboxy-2β-methyl-4b,8a-seco-4b,8a - difluoromethano - 1,2,3,4-tetrahydrophenanthrene product.

In like manner, 1,6-difluoromethano-[10]-annulene is prepared.

EXAMPLES 12 TO 21

In accordance with the foregoing methods, the respective starting compounds set forth in Column A below are reacted with the respective reactants set forth in Column B below to provide the respective product set forth in Column C below.

(A)

2-(1',2',2'-trimethyl-3'-hydroxy-n-propyl)-9,10-methano-1,4,5,8,9,10-hexahydronaphthalene,
2-(1'-ethyl-2',2'-dimethyl-3'-acetoxy-n-propyl)-9,10-dichloromethano-1,4,5,8,9,10-hexahydronaphthalene,
2-(1'-ethyl-2',2'-dimethyl-3'-carbamoyl-n-propyl)-9,10-methano-1,4,5,8,3,10-hexahydronaphthalene,
1-carbopropoxymethyl-9,10-difluoromethano-1,4,5,8,9,10-hexahydronaphthalene,
1-(1'-hydroxymethyl)-9,10-methano-1,4,5,8,9,10-hexahydronaphthalene,
2-(1'-n-butoxy-n-propyl)-9,10-dichloromethano-1,4,5,8,9,10-hexahydronaphthalene,
2-carboxymethyl-9,10-methano-1,4,5,8,9,10-hexahydronaphthalene,
1α-ethyl-2α-carbopropoxy-2β-ethyl-4b,8a-difluoromethano-1,2,3,4,4a,4b,5,8,8a,9-decahydrophenanthrene,
1α-methyl-2α-carboxy-2β-ethyl-4b,8a-methano-1,2,3,4,4a,4b,5,8,8a,9-decahydrophenanthrene,
1α-ethyl-2α-hydroxymethyl-2β-methyl-4b,8a-dichloromethano-1,2,3,4,4a,4b,5,8,8a,9-decahydrophenanthrene.

(B)

1,2-benzoquinone,
1,4-benzoquinone,
2,3-dichloro-5,6-dicyano-1,4-benzoquinone,
tetrachloro-1,2-benzoquinone,
tetrachloro-1,4-benzoquinone,
2,3-difluoro-1,2-benzoquinone,
2,3-difluoro-1,4-benzoquinone,
2,3-dicyano-1,2-benzoquinone,
2,3-dicyano-1,4-benzoquinone,
2,3-dichloro-5,6-dicyano-1,4-benzoquinone.

(C)

3-(1',2',2'-trimethyl-3'-hydroxy-n-propyl)-1,6-methano-[10]-annulene,
3-(1'-ethyl-2',2'-dimethyl-3'-acetoxy-n-propyl)-1,6-dichloromethano-[10]-annulene,
3-(1'-ethyl-2',2'-dimethyl-3'-carbamoyl-n-propyl)-1,6-methano-[10]-annulene,
2-carbopropoxymethyl-1,6-difluoromethano-[10]-annulene,
2-formyl-1,6-methano-[10]-annulene,
3-(1'-n-butoxy-n-propyl(-1,6-dichloromethano-[10]-annulene,
3-carboxymethyl-1,6-methano-[10]-annulene,
1α-ethyl-2α-carbopropoxy-2β-ethyl-4b,8a-seco-4b,8a-difluoromethano-1,2,3,4-tetrahydrophenanthrene,
1α-methyl-2α-carboxy-2β-ethyl-4b,8a-seco-4b,8a-methano-1,2,3,4-tetrahydrophenanthrene,
1α-ethyl-2α-hydroxymethyl-2β-methyl-4b,8a-seco-4b,8a-dichloromethano-1,2,3,4-tetrahydrophenanthrene.

The following examples serve to indicate the manner by which the product compounds of the present invention can be further elaborated.

EXAMPLE 22

A solution of 1 g. of 2,2-dimethyl-3-(1',6'-methano-[10]-annulene)-propionic acid in 30 ml. of anhydrous methylene chloride is allowed to react with 1 g. of N-(2-chloro-1,1,2-trifluoroethyl)diethylamine. The reaction mixture is heated under reflux for a period of five hours. The mixture is then poured into ice water, and the product extracted with ether. The extracts are dried and evaporated to dryness to yield 2,2-dimethyl-3-(1',6'm-ethano-[10]-annulene)-propionic acid fluoride.

The foregoing method can be performed upon the other corresponding annulene products hereof so as to prepare the corresponding carboxylic acid fluoride compounds.

EXAMPLE 23

A solution of 1 g. of 1α-ethyl-2α-carboethoxy-2β-methyl-4b,8a-seco-4b,8a-difluoromethano - 1,2,3,4-tetrahydrophenanthrene in 50 ml. of tetrahydrofuran is added over a 30 minute period to a stirred suspension of 1 g. of lithium aluminum hydride in 50 ml. of anhydrous tetrahydrofuran and this mixture is heated at reflux for two hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 1α-ethyl-2α-hydroxymethyl - 2β - methyl - 4b,8a - seco - 4b,8a - difluoromethano-1,2,3,4-tetrahydrophenanthrene which may be further purified through recrystallization from acetone:hexane.

EXAMPLE 24

A mixture of 1 g. of 1α-ethyl-2α-hydroxymethyl-2β-methyl-4b,8a-seco-4b,8a-methano - 1,2,3,4 - tetrahydrophenanthrene, 1 g. of p-toluenesulfonic acid monohydrate, 50 ml. of acetic acid and 25 ml. of acetic anhydride is allowed to stand at room temperature for 24 hours, and then it is poured into water and stirred. This mixture is then extracted with methylene chloride and these extracts are dried and evaporated to yield 1α-ethyl-2α-acetoxymethyl-2β-methyl - 4b,8a - seco-4b,8a-methano-1,2,3,4-tetrahydrophenanthrene which is recrystallized from acetone:ether.

In like manner, the other hydroxy containing annulene products prepared in accordance with the above methods are converted to the corresponding acetate esters. Further, the foregoing method can be used with an alternative carboxylic acid and anhydrides so as to prepare the corresponding alternate carboxylate acid esters of the hydroxy containing annulene products hereof, for example, the propionate, the butyrates, the valerates, the caproates, the enanthates, and the caprylates.

EXAMPLE 25

Two milliliters of dihydropyran are added to a solution of 1 g. of 1α-ethyl-2α-hydroxymethyl-2β-methyl-4b,8a-seco-4b,8a-methano-1,2,3,4-tetrahydrophenanthrene in 15 ml. of benzene. About 1 ml. is removed by distillation to remove moisture and 20 mg. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with ether:hexane, to yield 1α-ethyl-2α-tetrahydropyran-2'-yloxymethyl-4b,8a-seco-4b,8a-methano - 1,2,3,4 - tetrahydrophenanthrene which is recrystallized from ether-hexane.

In like manner, the foregoing method can be utilized substituting dihydrofuran for dihydropyran so as to prepare the corresponding tetrahydrofuran-2'-yloxy compound. Similarly, the foregoing method can be used with the other hydroxy annulene products hereof so as to prepare the corresponding ethers thereof.

EXAMPLE 26

A solution of one chemical equivalent of 1α-ethyl-2α-hydroxymethyl-2β-methyl-4b,8a - seco - 4b,8a-methano-1,2,3,4-tetrahydrophenanthrene in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1α-ethyl-2α-cyclopentyloxymethyl-2β-ethyl-4b,8a - seco - 4b,8a-methano-1,2,3,4-tetrahydrophenanthrene which is further purified upon recrystallization from pentane.

The foregoing method can be performed upon the other corresponding annulene products hereof so as to prepare the corresponding cyclopentyloxy compounds.

EXAMPLE 27

A solution of 1 g. of 1α-ethyl-2α-carboethoxy-2β-methyl - 4b,8a - seco-4b,8a-difluoromethano-1,2,3,4-tetrahydrophenanthrene in 50 ml. of ethylene glycol is heated at reflux for three hours with a solution of potassium hydroxide in 1 ml. of water. The reaction mixture is then poured into ice water and the solid which forms is collected by filtration, washed with water to neutrality and dried to yield 1α-ethyl-2α-carboxy-2β-methyl-4b,8a-seco-4b,8a-difluoromethano - 1,2,3,4 - tetrahydrophenanthrene which is recrystallized from methylene chloride:ether.

The foregoing method can be performed upon the other corresponding annulene products hereof so as to prepare the corresponding carboxylic acid compounds.

EXAMPLE 28

A solution of 1 g. of 2,2-dimethyl-3-(1',6'-methano-[10]-annulene)-pentanoic acid in 120 ml. of carbon tetrachloride is allowed to react with 2 g. of triphenylphosphine. The reaction mixture is held at 25° C. for a period of twelve hours. The mixture is then poured into ice water, and the organic phase is separated. This solution is dried and evaporated to dryness to yield 2,2-dimethyl-3-(1',6'-methano-[10]-annulene)-pentanoic acid chloride which is purified by chromatography over florisil and recrystallized from acetone:hexane.

The foregoing method can be performed upon the other corresponding annulene products hereof so as to prepare the corresponding acid chloride compounds.

EXAMPLE 29

To a solution of 10 g. of 1α-ethyl-2α-carboxy-2β-methyl - 4b,8a - seco-4b,8a-difluoromethano-1,2,3,4-tetrahydrophenanthrene in 200 ml. of ethanol is added the theoretical amount of potassium hydroxide dissolved in 200 ml. of 90% ethanol. The reaction mixture is then concentrated in vacuum giving potassium 1α-ethyl-2β-methyl-4b,8a-seco - 4b,8a - difluoromethane-1,2,3,4-tetrahydrophenanthrene-2α-carboxylate.

The foregoing method can be performed upon the other corresponding annulene products hereof so as to prepare the corresponding metal salts thereof.

Similarly, by following analogous procedures, the other metal salts contemplated herein are prepared.

EXAMPLE 30

A solution of 10 g. of 2,2-dimethyl-3-(1',6'-dichloromethano-[10]-annulene)-pentanoic acid in 50 ml. of thionyl chloride is heated at reflux for one hour. Thereafter, the solution is evaporated to dryness to give the corresponding acid chloride to which is added a concentrate ethereal ammonia solution. The resultant solution is evaporated giving 2-2-dimethyl-3-(1',6'-dichloromethano-[10]-annulene)-pentanoic acid amide.

The foregoing method can be performed upon the other corresponding annulene products hereof so as to prepare the corresponding carboxylic acid amide compounds.

EXAMPLE 31

A solution of 10 g. of 1α-ethyl-2α-carboxy-2β-methyl-4b,8a-seco - 4b,8a - methano - 1,2,3,4 - tetrahydrophenanthrene in 500 ml. of methanol is treated with 10 ml. of methanol which is saturated with hydrochloric gas. After maintaining this treatment for 6 hours at 20° C., the solution is evporated providing methyl 1α-ethyl-2β-methyl-4b,8a-seco - 4b,8a - methano - 1,2,3,4 - tetrahydrophenanthrene-2α-carboxylate.

EXAMPLE 32

A solution of 6 g. of 1α-ethyl-2α-hydroxymethyl-2β-methyl-4b,8a-seco - 4b,8a - methano - 1,2,3,4 - tetrahydrophenanthrene in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 1α - ethyl - 2α - formyl - 2β - methyl - 4b,8a - seco - 4b,8a-methano-1,2,3,4-tetrahydrophenanthrene.

EXAMPLE 33

A mixture of 3 g. of methyl 2,2-dimethyl-3-(1',6'-difluoromethano - [10] - annulene)-propionate, one molar equivalent of sodium methoxide, one molar equivalent of hydroxylamine hydrochloride and 50 ml. of methanol is allowed to stand for about 16 hours. The mixture is then filtered and the filtrate evaporated. The residue is neutralized by the addition of aqueous 1 N hydrochloric acid and extracted with ether. The ether extracts are combined, washed with water, dried and evaporated to yield 2,2 - dimethyl-3-(1',6'-difluoromethano-[10]-annulene)-pentanoylhydroxamic acid.

EXAMPLE 34

1,6-methano - [10] - annulene-2-carboxylic acid is prepared from 1,6 - methano-[10]-annulene following the acetylation and acid conversion methods of Vogel et al., Angewandte Chemie Internat. Ed., 3, 642, 1964. 1,6-methano-[10]-annulene-2-carboxylic acid (1 g.) is refluxed in thionylchloride (25 ml.) for 1 hour. Excess thionyl chloride is then removed under vacuum to yield the crude acid chloride. A solution of diazomethane (ca. 0.5 g.) in ether (100 ml.) is added to the acide chloride, and the solution left at room temperature for 2 hours. Excess diazomethane and ether are removed under vacuum to yield the crude diazoketone which is dissolved in dioxan (50 ml.). A suspension of silver oxide (from 2.0 g. silver nitrate) is then added, and the mixture heated to 90° C. for 2 hours. The solution is cooled and filtered and extracted with ether. The extract is washed (water) dried and evaporated to yield 1,6-methano-[10]-annulene-2-acetic acid, which is recrystallized from aqueous methanol.

Likewise prepared are 1,6-dichloromethano- and 1,6-difluoromethano-[10]-annulene-2-acetic acid from 1,6-dichloromethano- and 1,6-difluoromethano-[10]-annulene, respectively.

What is claimed is:

1. In the process useful for preparing a 1,6-dihalomethano-[10]-annulene, the step which comprises reacting a 9,10-dihalomethano - 1,4,5,8,9,10 - hexahydronaphthalene wherein halo is chloro or fluoro, with an ortho benzoquinone or parabenzoquinone which can be substituted with acyl, cyano, or halogen, under reactive conditions.

2. The process according to claim 1 conducted at from about 0° C. to the reflux temperature, optionally in the presence of inert, liquid organic reaction medium.

3. The process according to claim 2 wherein the 9,10-dihalomethano-1,4,5,8,9,10-hexayhdronaphthalene is one of the formula:

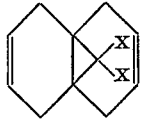

and the 1,6-dihalomethano-[10]-annulenue is one of the formula:

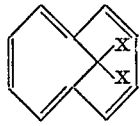

wherein, in each formula, each X is chloro or fluoro.

4. The process according to claim 3 wherein the benzoquinone is selected from the group consisting of 1,2-benzoquinone,
1,4-benzoquinone,
2,3-dichloro-5,6-dicyano-1,4-benzoquinone,
tetrachloro-1,2-benzoquinone,
tetrachloro-1,4-benzoquinone,
2,3-difluoro-1,2-benzoquinone,
2,3-difluoro-1,4-benzoquinone,
2,3-dicyano-1,2-benzoquinone, and
2,3-dicyano-1,4-benzoquinone.

5. The process according to claim 3 wherein the benzoquinone is 2,3-dichloro-5,6-dicyano-1,4-benzoquinone.

6. The process according to claim 5 wherein each X is chloro.

7. The process according of claim 5 wherein each X is fluoro.

8. In the process useful for preparing a 1,6-dihalomethano-[10]-annulene, the steps comprising reacting a reagent which generates the group >CX₂ wherein each X is chloro or fluoro, with a 1,4,5,8-tetrahydronaphthalene to yield the corresponding 9,10-dihalomethano-1,4,5,8,9,10-hexahydronaphthalene, wherein halo is chloro or fluoro, and reacting the resulting 9,10-dihalomethano-1,4,5,8,9,10-hexahydronaphthalene with an ortho benzoquinone or para benzoquinone which can be substituted with acyl, cyano, or halogen, under reactive conditions.

9. The process according to claim 8 wherein the 9,10-dihalomethano-1,4,5,8,9,10-hexayhdronaphthalene is one of the formula:

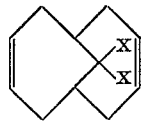

and the 1,6-dihalomethano-[10]-annulenue is one of the formula:

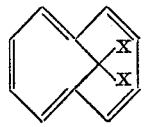

wherein, in each formula, each X is chloro or fluoro.

10. The process according to claim 9 wherein the benzoquinone is 2,3-dichloro-5,6-dicyano-1,4-benzoquinone.

11. The process according to claim 10 wherein each X is chloro.

12. The process according to claim 10 wherein each X is fluoro.

References Cited

Proceedings of the Robert A. Welsh Foundation Conference on Chemical Research XII Organic Synthesis; Houston, Tex., 1969, chapter VII, pp. 215–251.

Vogel et al.: Angew. Chem. Internat. Edit. 3, 228–229 (1964).

Rautenstrauch et al.: Angew. Chem. Internat. Edit. 7, 288–289 (1968).

DANIEL D. HORWITZ, Primary Examiner

U.S. Cl. X.R.

260—648 D, 648 F, 668, 599, 469, 611, 618, 557